(12) United States Patent
Ibata et al.

(10) Patent No.: US 6,271,610 B1
(45) Date of Patent: Aug. 7, 2001

(54) ELECTROMAGNETIC VIBRATOR AND DEVICE INCORPORATING THE SAME

(75) Inventors: Eiichi Ibata; Toshiaki Tsuzaki; Kodo Fukuoka, all of Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/384,739

(22) Filed: Aug. 27, 1999

(30) Foreign Application Priority Data

Aug. 28, 1998 (JP) .................................................. 10-243116

(51) Int. Cl.[7] .............................. H02K 7/06; H02K 11/00
(52) U.S. Cl. ...................... 310/81; 310/71; 310/40 MM; 310/DIG. 6
(58) Field of Search ......................... 310/81, 71, 40 MM, 310/DIG. 6; 29/842, 844, 845; 340/825.46

(56) References Cited

U.S. PATENT DOCUMENTS

| | | | |
|---|---|---|---|
| 4,494,026 | * 1/1985 | Abe | 310/89 |
| 4,864,276 | 9/1989 | Tribbey et al. | 340/407 |
| 5,943,214 | * 8/1999 | Sato et al. | 361/752 |
| 5,986,367 | * 11/1999 | Tsuzaki et al. | 310/71 |

FOREIGN PATENT DOCUMENTS

| | | |
|---|---|---|
| 08140301 | 5/1996 | (JP) . |
| 08308170 | 11/1996 | (JP) . |
| 10117460 | 5/1998 | (JP) . |
| WO 99/23801 | 5/1999 | (JP) . |

* cited by examiner

*Primary Examiner*—Nestor Ramirez
*Assistant Examiner*—Dang Dinh Le
(74) *Attorney, Agent, or Firm*—Ratner & Prestia

(57) ABSTRACT

An electromagnetic vibrator includes a vibration generating mechanism; a case for containing at least part of the vibration generating mechanism; a power supply terminal for supplying power to the vibration generating mechanism, protruding from the case; an elastic body covering at least part of the case; and an elastic pressing body deformable under pressure, formed in part of the elastic body. When the electromagnetic vibrator is incorporated into a device, part of the device presses the case. Correspondingly, the elastic pressing body presses the power supply terminal toward a power supply land disposed on the device side, and the power supply terminal contacts the power supply land thereby electrically connecting itself to the power supply land. With this construction is provided a highly reliable electromagnetic vibrator and device incorporating the electromagnetic vibrator with electric connections having high vibration resistance and impact resistance.

15 Claims, 8 Drawing Sheets

ELECTROMAGNETIC VIBRATOR AND DEVICE INCORPORATING THE SAME

FIELD OF INVENTION

The present invention relates to electromagnetic vibrators incorporated into devices driven mainly by batteries, and such devices. The present invention specifically relates to the electric connections between an electromagnet vibrator and a device, where an elastic body interfaces in between.

BACKGROUND OF THE INVENTION

Among devices driven by batteries, especially mobile information devices such as portable telephones and personal information management (PIM) devices, there are devices which inform a user of incoming calls through bodily sensation by the vibration of an electromagnetic vibrator incorporated in the device.

A widely used vibrating method uses an electromagnetic vibrator as a drive for cost and energy efficiency reasons. Some electromagnetic vibrators contain a rotation-vibration structure in which an eccentric weight is attached to a motor while others have a reciprocating-vibration structure such as a speaker.

As a method of fixing the electromagnetic vibrator to the device, in most of the cases, one of the following methods is adopted. One method uses screws to fix the electromagnetic vibrator firmly to the device. In the other method, the electromagnetic vibrator is inserted into the device via an elastic body. With the latter method, the electromagnetic vibrator can be protected from impact caused when the device is accidentally dropped. Furthermore, since there is an elastic body, its cushioning function provides a shock absorbing effect to the whole body of the device itself. For these reasons the latter method is more widely used.

The main components to be incorporated into a portable device of this kind, are a button battery, electronic components and an electromagnetic vibrator. Common electric connection methods between those components and the device include the following.

The first method is used when incorporating the button battery into the device. A structure in which a flat spring protruding from the device contacts elastically an electrode of the button battery, is adopted so that the button battery can be easily placed and removed. The next method is used when mounting electronic components on a printed circuit board. In this case, the electronic components are mounted by reflow-soldering.

A conventional method used when incorporating the electromagnetic vibrator into the device is described as follows. FIG. 8 shows a side view of a conventional mounting structure of a motor functioning as an electromagnetic vibrator incorporated into the device.

In FIG. 8, a slim cylindrical motor 151 functioning as an electromagnetic vibrator has a case 153. One end of the output shaft of the motor 151 protrudes out of the case 153. The tip of the shaft is provided with an eccentric weight 200. With the rotation of the motor 151, the eccentric weight 200 rotates generating vibration.

The case 153 of the motor 151 is covered with a boot 155 made of synthetic rubber, and is placed between a mounting plate 161 and a housing 162 of the device.

Conventionally, in the case of the motor 151 which is elastically disposed in the above-mentioned manner, a lead line 154 for supplying electricity to the motor 151 is connected by soldering considering the reliability.

However, in recent years, there has been increasing demand for an improved productivity by using automatic assembling machine to facilitate incorporation of the electromagnetic vibrator into the device. To respond to such demand, when incorporating the electromagnetic vibrator into the device, the method used when incorporating a button battery into the device, has come to be adopted. That is, an elastically-connected electric connection structure has been more widely used. One of the related prior arts was disclosed in Japanese Patent Application Unexamined Publication No. H08-308170.

FIG. 9 shows a perspective view of a conventional mounting structure of a motor to the device.

In FIG. 9, an eccentric weight 192 is attached to a rotation shaft of a slim cylindrical motor 181. The motor 181 and the eccentric weight 182 constitute the electromagnetic vibrator. A case 183 of the motor 181 is fixed to a mounting board 191 by elastic holders 192. Electrodes (not illustrated) which connect inside of the motor, are formed on one end of the case 183. Elastic holders 193 protrude from the mounting board 191. The electrode mentioned above contact with a pair of holders 193. The device and the motor 181 are electrically connected by the holders 193 to supply electricity to the motor 181. With this construction, the motor 181 is fixed to the mounting board 191 as firmly as being screwed. Furthermore, the motor 181 can easily be incorporated into the device, and the electric connection is secured.

However, this conventional construction can not be adopted to the case in which a motor functioning as an electromagnetic vibrator is incorporated into the device while holding the motor elastically. Providing the conventional construction is adopted, if the motor being held elastically is incorporated into the device, a contact failure would possibly occur due to the sliding of the electric connection caused by vibration. This possibility is also mentioned in H08-308170.

In the technical field of the present invention, as FIG. 9 illustrates, reliability of the electric connections provided through the elastic contact could be maintained if the electromagnetic vibrator is firmly fixed to the device. However, when the electromagnetic vibrator held elastically is incorporated into the device, the reliability of the elastically contacting section can not be maintained, if the electric connection is provided through the elastic contact. In other words, there is an antinomy relationship between incorporating the electromagnetic vibrator, held elastically into the device and providing the electric connection through elastic contact.

In order to hold the electromagnetic vibrator elastically, the elastically contacted portion needs to resist the external impact. However, such impact resistance has been difficult to achieve in the technology field of the present invention where components are very small.

SUMMARY OF THE INVENTION

An electromagnetic vibrator can be easily fabricated, and has high reliability in electric connections, as well as being highly reliable when incorporated in a device.

The electromagnetic vibrator comprises the following elements:
 (a) a vibration generating mechanism;
 (b) a case for containing at least part of the vibration generating mechanism;
 (c) power feeding terminals for supplying power to the vibration generating mechanism, protruding from the case;

(d) an elastic body covering at least part of the case; and (e) an elastic pressing body deformable under pressure, formed in part of the elastic body.

When the electromagnetic vibrator is incorporated into a device, a part of the device presses the case. Therefore, the elastic pressing body presses the power feeding terminals toward power feeding lands disposed on the device side, and the power feeding terminals contact the power feeding lands thereby electrically connecting themselves with the power feeding lands. In another construction of the present invention, instead of the elastic pressing body formed in a part of the elastic body, an independently formed, deformable, elastic pressing body is disposed on a position overlapping the power feeding terminals.

A device may incorporate the electromagnetic vibrator having the foregoing construction.

With the construction described above, when the electromagnetic vibrator is incorporated into the device, the electric connection of the electromagnetic vibrator can be provided by crimping while maintaining its elasticity. The electromagnetic vibrator can be easily incorporated into the device by mounting it on a mounting board and providing a housing thereon. The electric connection can also be very easily provided, without soldering, by simply incorporating the electromagnetic vibrator into the device.

This construction provides a shock absorbing effect to the device, which protects the electromagnetic vibrator from damage caused by a drop impact. In addition to the above-mentioned advantages, a connection failure caused by the vibration on the electrically connected sections and by impact can be prevented thereby, realizing a high reliability in the electric connections.

BRIEF DESCTIPTION OF THE DRAWINGS

DETAILED DESCRIPTION OF THE INVENTION

The preferred embodiments of the present invention are described hereinafter with reference to the drawings.

(First Preferred Embodiment)

Figure 1A:
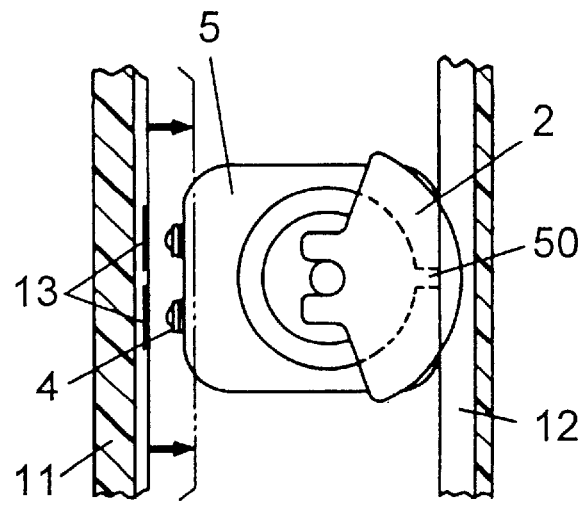
FIG. 1A shows an axial view of an electromagnetic vibrator and a mounting structure for a motor, when the electromagnetic vibrator is incorporated into a device in accordance with a first exemplary embodiment of the present invention.
Figure 1B:
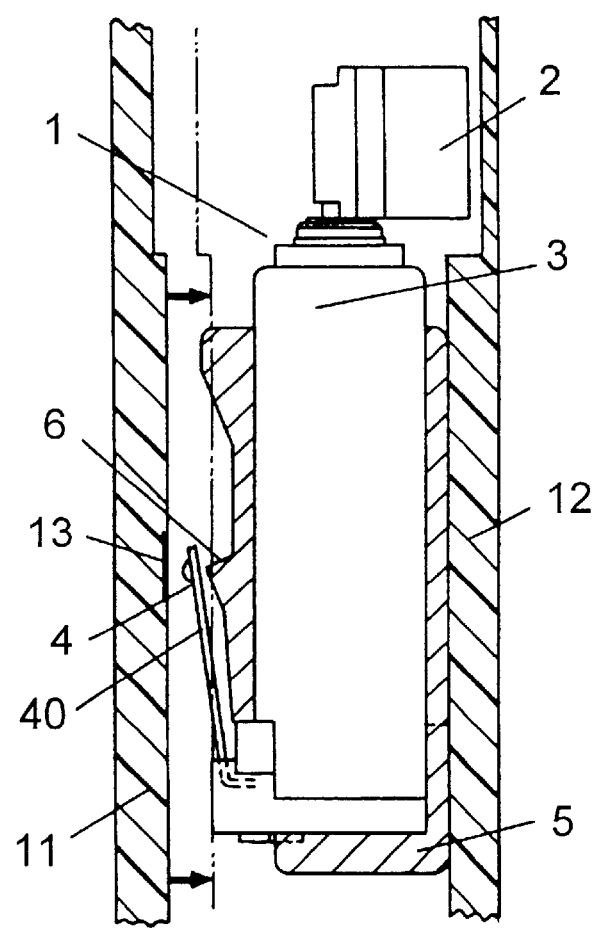
FIG. 1B shows a side view of the mounting structure of the motor to the device.

FIG. 1A shows an axial view of an electromagnetic vibrator and a mounting structure for a motor when the electromagnetic vibrator is incorporated into a device. FIG. 1B shows a side view of the mounting structure of the motor to the device.

In FIG. 1A and FIG. 1B, an eccentric weight 2 is attached to the rotation shaft of a slim cylindrical motor 1. A driving mechanism which rotate the rotation shaft is contained in a case 3. The rotation driving mechanism and the eccentric weight 2 constitute the vibration generating mechanism.

A concrete example of the structure of the vibration generating mechanism is given below.

The motor 1 is a core-less motor of, for example, 6 mm in diameter and 15 mm in length. The construction of the motor 1 is described below. A rare-earth magnet, shaped as a hollow cylinder, is fixed to the inner wall of the case 3. The motor 1 has an armature, but the armature does not have iron core. Instead, the armature has a coil shaped as a hollow cylinder. A rotation shaft is attached to the coil, and a commutator is disposed to the rotation shaft. A brush is attached to the case 3 opposite the commutator. A cylindrical yoke is disposed to the hollow of the coil. A bearing is fixed to the yoke. The rotation shaft penetrates the core of the yoke in the axial direction, and is rotatablly supported by the bearing. The inner wall of the magnet and the outer wall of the coil, and inner wall of the coil and the outer wall of the yoke are respectively disposed via different annular spaces so that each of the three components faces one another. The armature can be rotated by supplying electricity to the coil via the brush and the commutator from the outside of the motor. This construction allows the armature to be low in inertia, and achieves a motor which can spin with low power consumption and start up with low voltage. The motor with above-mentioned structure and characteristics is preferable as the driver of the electromagnetic vibrator to be incorporated into the device driven by batteries. Attached at the tip of the rotation shaft is an eccentric weight made of material high in specific gravity, such as tungsten. With the rotation of the armature, the eccentric weight rotates and thereby generating vibration.

Referring again to FIG. 1A and FIG. 1B, power feeding terminals 4 shaped as flat springs protrude from one end of the case 3. A boot 5, an elastic body made of synthetic rubber, covers the case 3. The boot 5 is approximately cup shaped. By cutting a portion 50 of the boot 5 open, the case 3 can be easily contained.

A mounting board 11 and a housing 12 are disposed on the device side. The motor 1 is sandwiched between the mounting board 11 and the housing 12. Power feeding lands 13 are formed on the mounting board 11, in the position corresponding to the power feeding terminals 4. The motor 1 is supplied with electricity when the power feeding terminals 4 contact the power feeding lands 13.

With the above-mentioned construction, when the motor 1 is placed on the mounting board 11 and the housing 12 is fixed firmly thereon, the motor 1 is crimped to the mounting board. At the same time, the power feeding terminals 4 elastically contact the power feeding lands 13.

In the description of FIG. 1A and 1B the mounting board 11 itself approaches to and contacts the motor 1. An actual device would contain a member for determining the position front-to-back and right-to-left so that the power feeding terminals 4 correctly contact the power feeding lands 13. However, since such a function is not the main aim of the present invention, it is omitted here to make the description less complicated.

As has been described, a device having a structure in which the motor is held elastically while maintaining elastic electric connections, can be easily assembled.

The structure of the electric connections, which is the main theme of the present invention, is describe below in further details.

As has been described before, the power feeding terminals 4 shaped as flat springs protrude from one end of the case 3. Behind the power feeding terminals 4, an elastic pressing body 6 approximately triangle shaped is formed in a part of the boot 5. The power feeding terminals 4 elastically contact the power feeding lands 13 when the motor 1 is incorporated into the device. With the pressure provided by the case 3, the elastic pressing body 6 with a triangle shape, formed in a part of the boot 5, presses from behind the power feeding terminals 4. In this manner, the power feeding terminals 4 and the power feeding lands 13 are electrically connected.

Figure 2:
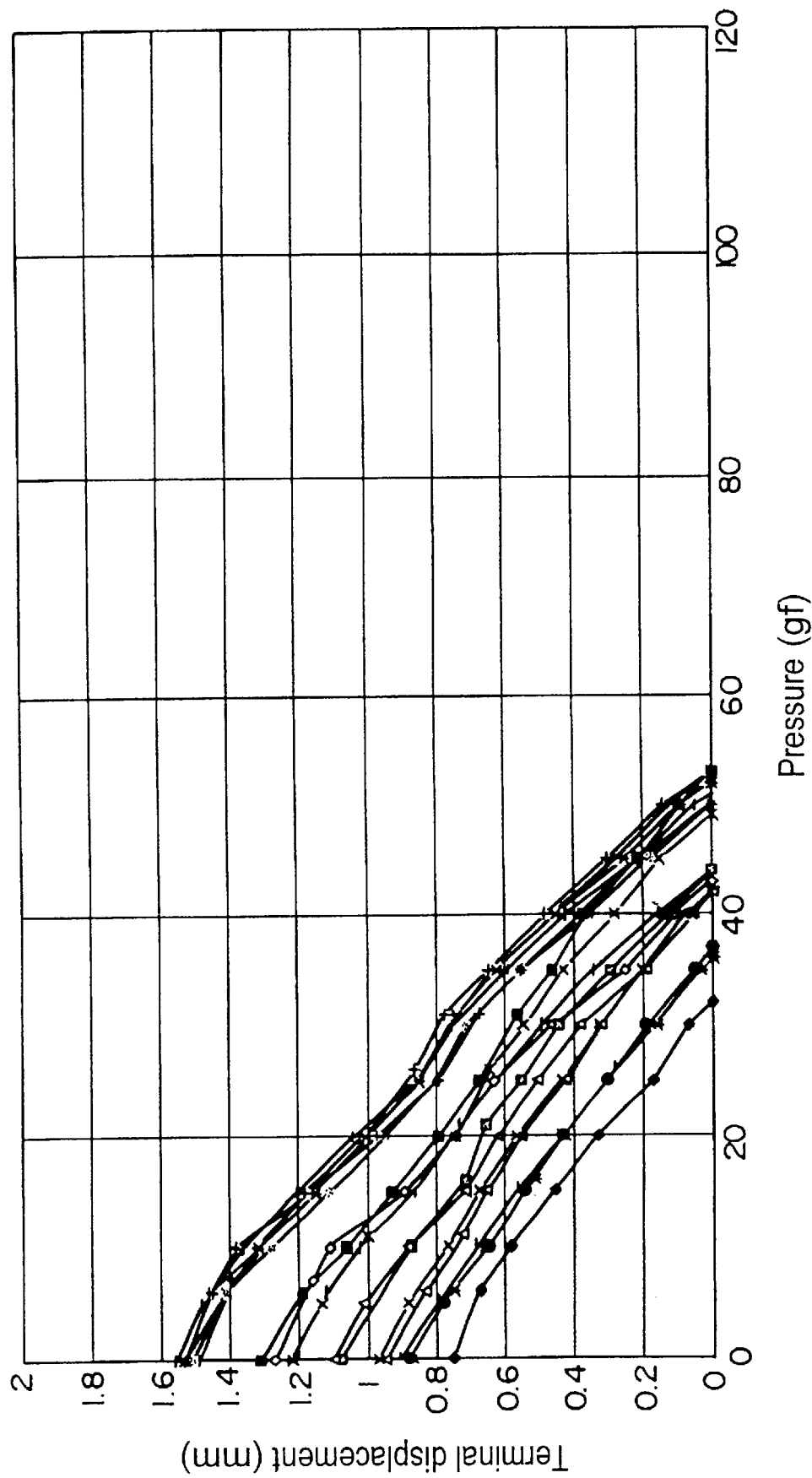
FIG. 2 is a chart describing the relationship between the pressure of a vibration generating mechanism on power feeding terminals and the terminal displacement when the electromagnetic vibrator is incorporated into the device (in the case when only power feeding terminals are employed without an elastic pressing body).
Figure 3:
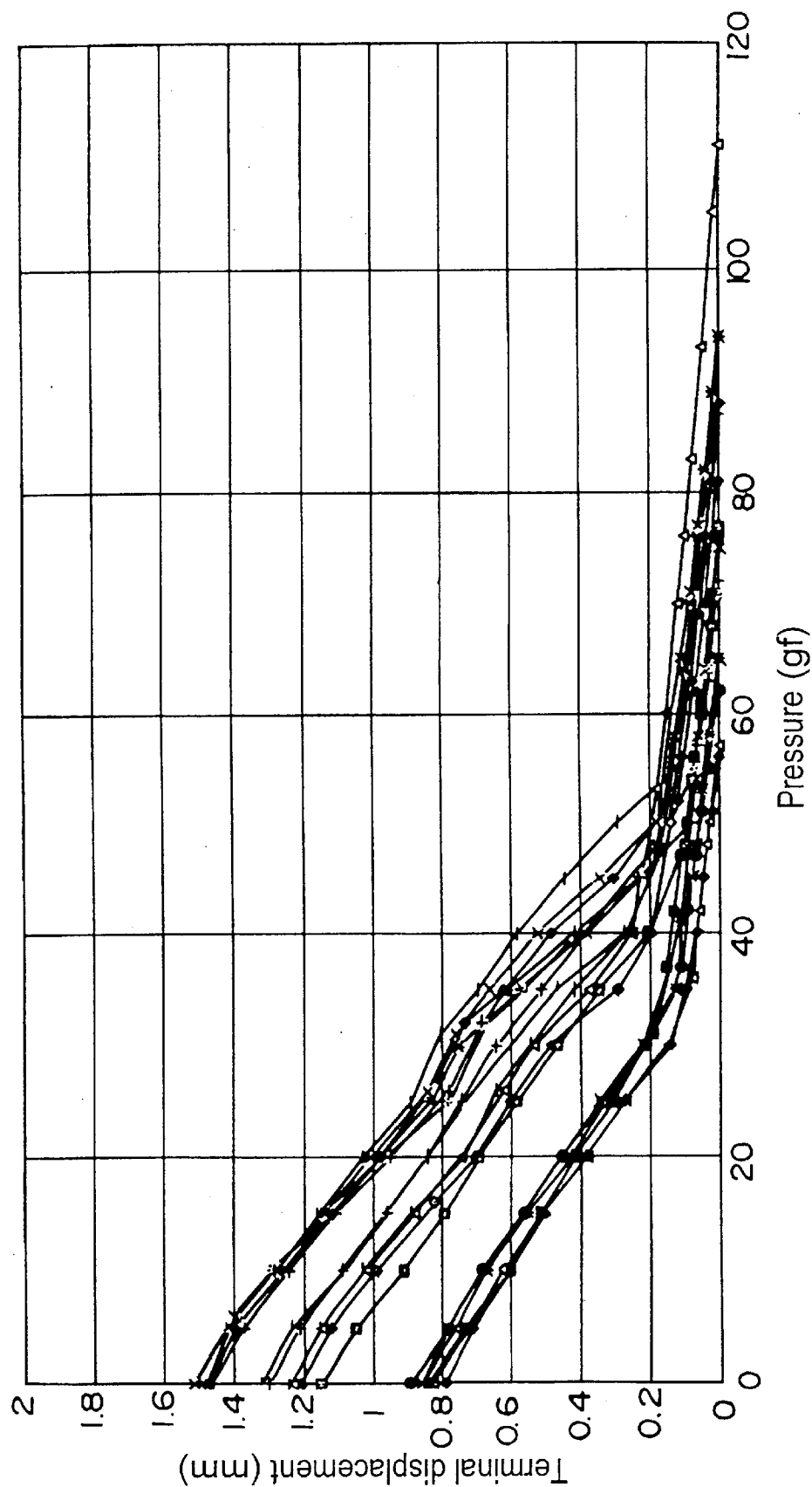
FIG. 3 is a chart describing the same relationship as the FIG. 2 when the elastic pressing body is provided to the power feeding terminals.

FIG. 2 and FIG. 3 are charts describing the relationship between the pressure on the power feeding terminals 4 and their terminal displacement when the electromagnetic vibrator is incorporated into the device.

In FIG. 2, the elastic pressing body 6 is not provided behind the power feeding terminals 4. Only the power feeding terminals 4 are provided. Whereas in FIG. 3, the elastic pressing body 6 is provided behind the power feeding terminals 4. In both charts, the horizontal axis shows the amount of pressure (gf) and the vertical axis, the terminal displacement (mm). The terminal displacement means the displacement of the power feeding terminals 4 in the direction away from the motor 1 providing the origin of the vertical axis is when the motor is incorporated into the device. The amount of the terminal displacement when the amount of the pressure is zero, is the free height of the power feeding terminals 4.

A plurality of lines in FIG. 2 are data gained using various samples considering production tolerance of the power feeding terminals. As is described, when the elastic pressing body 6 is not provided, all the lines are straight with almost the same slope. They indicate a linear displacement with almost the same elastic modulus. The pressure is 45 gf on average. Providing there is no vibration or impact, electric connection can be easily provided with this pressure. However, it was found, when the pressure declines to below 10 gf, relative sliding occurs in the electrically connected section between the power feeding terminals 4 and the power feeding lands 13 due to the vibration. The relative sliding generates polymers, and the electric connection is impeded.

It was also found that there is slight vibration in the flat springs 40 even when the pressure is large, which, in the long term, generates polymers. As the motor 1 is elastically held, a negative displacement shown in FIG. 2 occurred when a drop impact is applied to the device. The flat springs 40 of the power feeding terminals 4 exceed their elastic limit and are plastically deformed. As a result, pressure is reduced.

FIG. 3 shows data gained when the elastic pressing body 6 made of synthetic rubber is disposed behind the power feeding terminals 4. As was the case with FIG. 2, data were obtained using samples with the power feeding terminals 4 having different free heights. The elastic modulus is similar to the data shown in FIG. 2, in the section where the terminal displacement is large. However, in the section where the displacement of the terminal is small, i.e. the section close to the origin of the vertical axis, the elastic modulus is large with the pressure as high as 75 gf on average. In other words, the elastic pressing body 6 demonstrates a function of increasing pressure by about 30 gf. The elastic modulus increases in the section close to the origin of the vertical axis. Therefore, plastic deformation of the flat springs 40 of the power feeding terminals 4 can be avoided even if a drop impact is applied to the device.

Figure 4A:
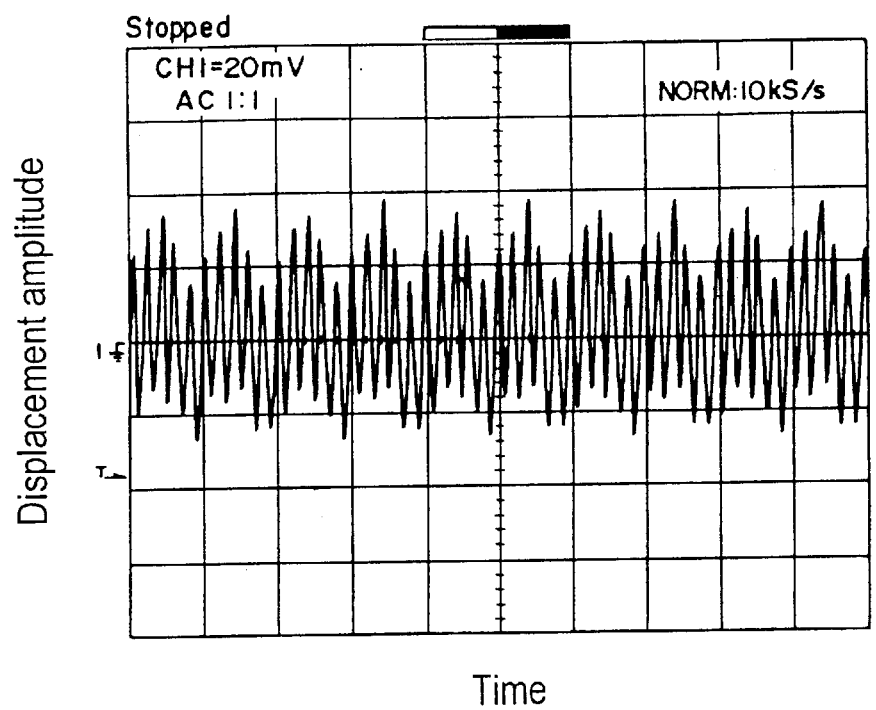
FIG. 4A is a chart showing a displacement amplitude of the micro-vibration of the power feeding terminals when there is no elastic pressing body but only the power feeding terminals.
Figure 4B:
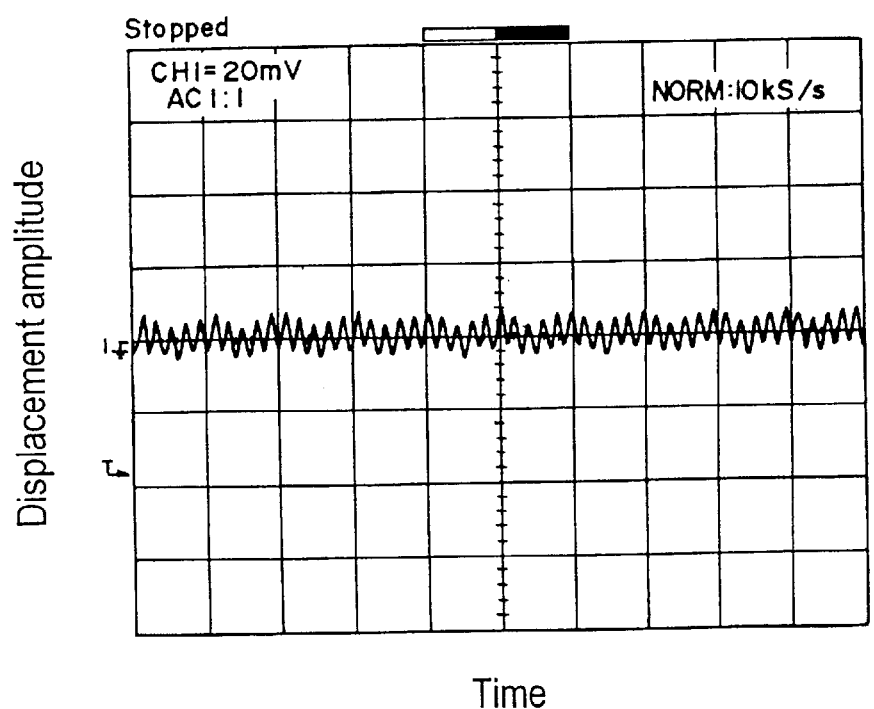
FIG. 4B is a chart showing a displacement amplitude of the micro-vibration of the power feeding terminals when the elastic pressing body is provided behind the power feeding terminals.

FIG. 4A and FIG. 4B are charts showing the condition of the micro-vibration of the power feeding terminals 4. The horizontal axis shows time and the vertical axis shows displacement amplitude of the flat springs 40 of the power feeding terminals 4 in the direction of the mounting board 11. The displacement amplitude was measured by using a laser displacement meter through a small hole made on the mounting board 11. FIG. 4A shows data recorded when the elastic pressing body 6 was not used. FIG. 4B shows data recorded when the elastic pressing body 6 is displaced behind the power feeding terminals 4. In FIG. 4A, the displacement amplitude is 1.1 $\mu$m, whereas the displacement amplitude in FIG. 4B is 0.19 $\mu$m. As it is clearly shown in both charts, the displacement amplitude of the power feeding terminals 4 is reduced to a fifth when the elastic pressing body 6 is disposed.

As has been described, this embodiment has a construction in which, when the motor 1 is incorporated, the mounting board 11 presses the case 3 whereby the elastic pressing body 6 presses the power feeding terminals 4. As a result, the power feeding terminals 4 contacts the power feeding lands 13. This construction has the following advantages.

Firstly, by selecting the elastic modulus of the elastic pressing body 6, contact pressure between the power feeding terminals 4 and the power feeding lands 13 can be determined with high degrees of freedom. Due to this, an appropriate contact pressure can be obtained considering various conditions, allowing highly reliable connections in a variety of uses. Furthermore, the elastic pressing body 6 can be set to provide major part of the pressure. If the contact pressure is attempted to be increased by adjusting only the power feeding terminals 4, not only the supporting structure of the power feeding terminals 4 but disposition of the surrounding members are affected. Thus, desired reliability in the connection becomes hard to gain.

Secondly, since the power feeding terminals 4 are pressed by the elastic pressing body 6, the vibration of the flat springs 40 of the power feeding terminals 4 is suppressed.

When the elastic pressing body 6 is not provided, one end of the flat springs 40 is fixed to the case 3 while the other end contacts the power feeding lands 13, and with these two ends being fixed points, vibration swinging most in the center of the flat springs 40 occurs. As mentioned earlier, this vibration was also a cause of declined reliability.

However, this vibration can be suppressed by fabricating such that the power feeding terminals 4 are pressed by the elastic pressing body 6. When the elastic pressing body 6 is made of material of high vibration damping capacity such as synthetic rubber, the vibration of the power feeding terminals 4 can be reduced effectively as shown in FIG. 4B with a concrete example. Thus, even when the electromagnetic vibrator oscillates, the sliding at the electrically connected section can be reduced or prevented. High reliability in the connections can be achieved.

The construction of this embodiment combines the elasticity of the power feeding terminals 4 and the pressure of the elastic pressing body 6. This construction brings about following advantages.

First, the contact pressure can be set with combined characteristics of two kinds of elasticity of the power feeding terminals 4 and the elastic pressing body 6. If the elasticity of the metallic flat springs constituting the power feeding terminals 4 and the pressure caused by the synthetic rubber constituting the elastic pressing body 6 are combined, characteristics of both materials can be combined. In other words, the constancy nature of the metallic material, which does not change over time, and the vibration damping nature of the synthetic rubber can be used as a combination. Therefore, a high reliability under a variety of environmental conditions can be achieved.

Secondly, as described in FIG. 3B the construction allows the displacement characteristics of the power feeding terminals 4 to be made nonlinear. In FIG. 3B, when the motor 1 moves away from the mounting board 11 due to the external force, and the power feeding terminals 4 are displaced largely, the flat springs 40 of the power feeding terminals 4 can easily follow the move. When the motor 1 moves toward the mounting board 11 due to the external force, the displacement of the power feeding terminals 4 become small or negative. In other words the power feeding terminals 4 bite in the elastic pressing body 6. In such a case, the mounting board 11, the power feeding terminals 4 and the elastic pressing body 6 are connected tightly increasing the rigidity, and the plastic deformation of the power feeding terminals 4 can be avoided. With these functions, the reliability in the connections can be maintained at a high level even when an impact is applied to the device.

The present embodiment further offers the following advantages.

The elastic pressing body 6 is integrally formed with the boot 5 covering the case 3 by synthetic rubber. In other words, this construction can be formed simply by adding the function of the elastic pressing body 6 to a part of the boot 5 which is for holding the motor 1 elastically. The elastic pressing body 6 does not have to be formed independently. Thus, extra cost is not needed to improve the efficiency of the electric connections. This embodiment realizes high reliability in connections without increasing the cost.

As FIG. 1B illustrates, the portion of the elastic pressing body 6 contacting the power feeding terminals 4 is provided with an approximately triangle protrusion. This shape allows a setting of the contact pressure between the power feeding terminals 4 and the power feeding lands 13 with high degrees of freedom. As a result, a desirable contact pressure applicable to various conditions can be gained, thereby providing a high reliability in connections for various uses. With the above-mentioned construction, this embodiment increases the amount of pressure by 30 gf on average. At the same time, the elastic modulus is set such that it does not exceed 500 gf under any conditions stipulated in the specifications.

In this embodiment, synthetic rubber is used for the elastic pressing body 6. Therefore, a terminal pressing structure with insulation and vibration dumping properties can be gained. When the elastic pressing body 6 is made of the synthetic rubber, insulation and vibration dumping properties do not have to be added separately to the power feeding terminals 4. High reliability in connections, therefore, can be achieved without an increase in cost.

As a material for the elastic pressing body 6, synthetic rubber is suitable from an industrial perspective. However, natural rubber, metal, or cotton or felt-like organic material can also be used. Another possible material for the elastic pressing body 6 is synthetic resin such as polyacetal. When looked at from the shaft of the motor, as shown in FIG. 1A, the power feeding terminals 4 are disposed within the width of the case 3 in this embodiment. The power feeding terminals 4 can be disposed beyond the width of the case 3, if necessary.

(Second Preferred Embodiment)

Figure 5A:
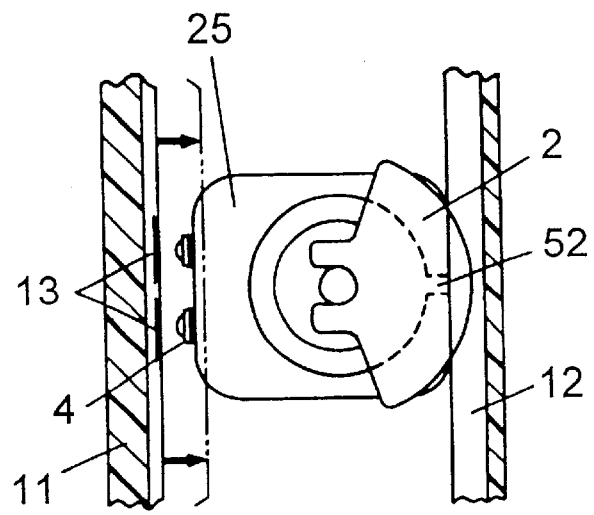
FIG. 5A shows an axial view of an electromagnetic vibrator and a mounting structure of a motor when the electromagnetic vibrator is incorporated into a device in accordance with a second exemplary embodiment of the present invention.
Figure 5B:
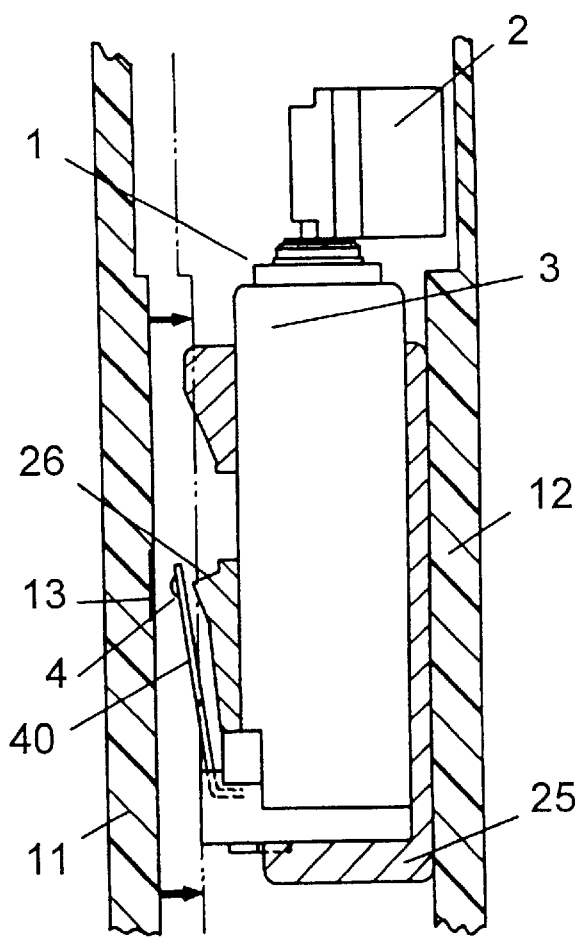
FIG. 5B shows a side view of the mounting structure of the motor to the device.

FIG. 5A shows an axial view of an electromagnetic vibrator and a mounting structure of a motor to the device when the electromagnetic vibrator is incorporated into a device. FIG. 5B shows a side view of the mounting structure of the motor.

The second embodiment differs from the first embodiment in the following points. In the first embodiment described in FIG. 1A and FIG. 1B, the boot 5 and the elastic pressing body 6 are formed integrally. However in the second embodiment described in FIG. 5A and FIG. 5B, a boot 25 and an elastic pressing body 26 are formed independently. Therefore, considering the functions of each component, the optimal material and construction can be selected. This in turn, realizes appropriate contact pressure, vibration dumping and environmental resistance properties for various conditions. Thus, a high reliability in connections for various uses is achieved.

In the second embodiment, the case 3 is covered with the boot 5 in order to hold the motor 1 elastically. However, instead of such structure, an elastic holding structure can be provided to the device side. Similarly, without providing the elastic pressing body 26 to the side of the motor, an elastic pressing body can be disposed behind the power feeding lands 13 on the device side by making them elastic so that some displacement of lands 13 can be expected.

(Third Preferred Embodiment)

Referring to FIG. 6A through FIG. 6D, details of the shape of the elastic pressing body in the third embodiment are described. The protrusions of the elastic pressing body are tentatively called a triangular protrusion in FIG. 6A, a hollow protrusion in FIG. 6B, a trapezoidal protrusion in FIG. 6C and a double-hump protrusion in FIG. 6D.

Figure 6A:
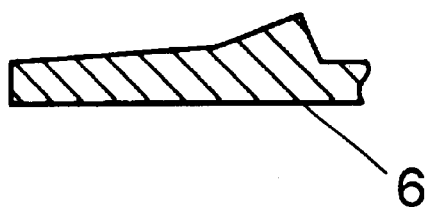
FIG. 6A shows the shape of a triangular protrusion of the elastic pressing body pressing the power feeding terminals of the vibration generating mechanism in accordance with a third embodiment of the present invention.

The triangular protrusion in FIG. 6A is the one adopted in the first embodiment. As has been described in FIG. 1A and FIG. 1B, the elastic pressing body presses the back of the electrically connected section of the power feeding terminals 4. At the same time, the slope of the elastic pressing body 4 facing the flat springs 40 smoothly contacts the power feeding terminals 4. This construction dumps the vibration of the flat springs 40. The angle of the slope of the elastic pressing body is set such that pressure characteristic mentioned above can be gained.

Figure 6B:
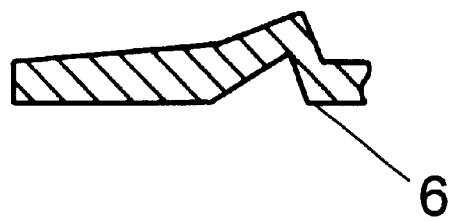
FIG. 6B shows a protrusion internally having a cavity of the same elastic pressing body.
Figure 6C:
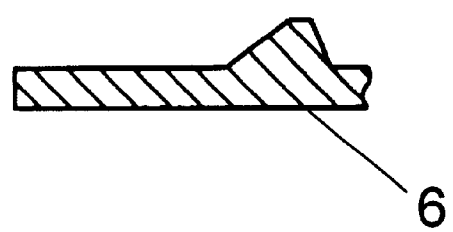
FIG. 6C shows a trapezoidal protrusion of the same elastic pressing body.
Figure 6D:
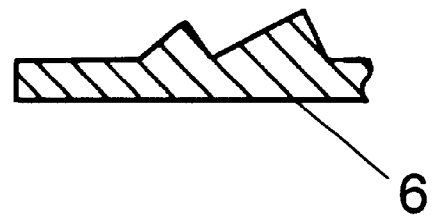
FIG. 6D shows a double-hump protrusion of the same elastic pressing body.

The hollow protrusion in FIG. 6B is suitable when the elastic modulus of the elastic pressing body needs to be small. The trapezoidal protrusion in FIG. 6C is preferable when the elastic modulus of the elastic pressing body needs to be large. The double-hump protrusion in FIG. 6D is appropriate when a further vibration dumping effect of the flat springs is required.

As above-mentioned description shows, by providing at least one protrusion to the elastic pressing body, the contact pressure property between the power feeding terminals 4 and the power feeding lands are determined with high degrees of freedom. An appropriate contact pressure can be gained considering various conditions thereby, achieving a high reliability in connections in various conditions.

(Fourth Preferred Embodiment)

Figure 7:
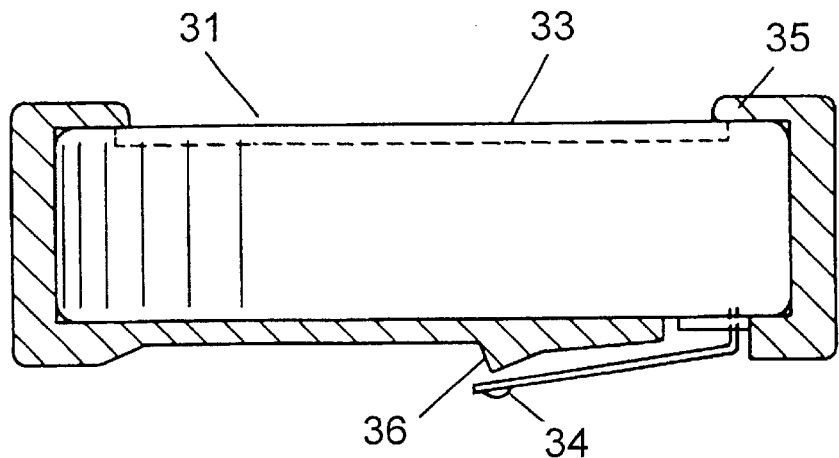
FIG. 7 shows a side view of an electromagnetic vibrator and a mounting structure of a motor when the electromagnetic vibrator is incorporated into a device in accordance with a fourth exemplary embodiment of the present invention.
Figure 8:
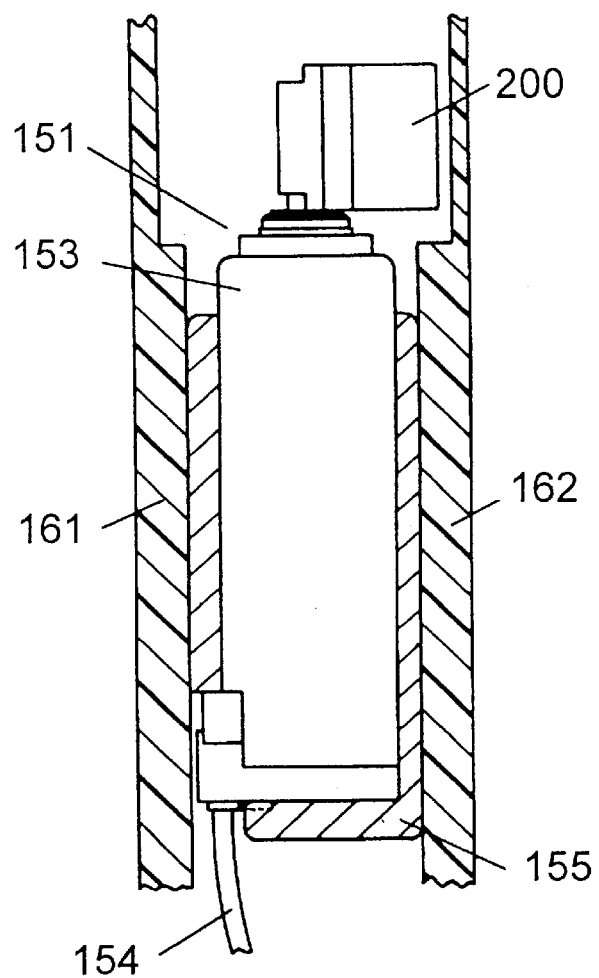
FIG. 8 shows a side view of a mounting structure of the motor to the device of the prior art.
Figure 9:
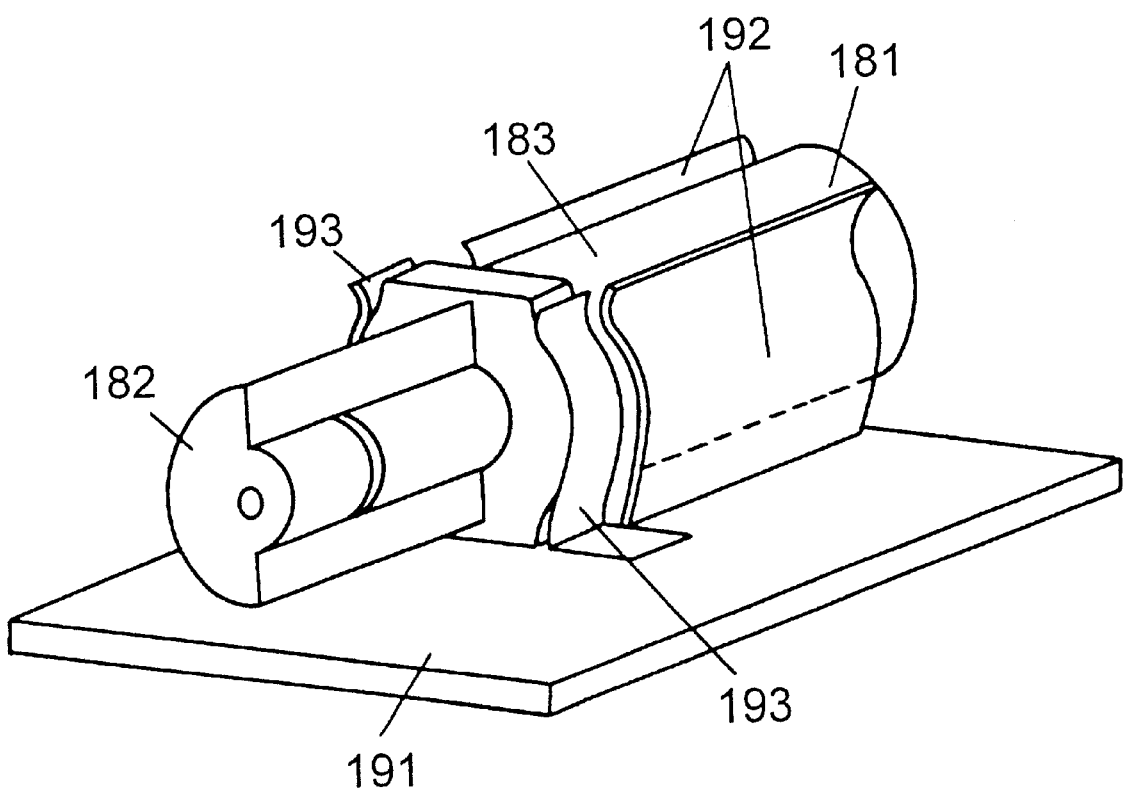
FIG. 9 shows a perspective view of a mounting structure of the motor to the device of another prior art.

FIG. 7 shows a side view of an electromagnetic vibrator and an mounting structure of a motor when the electromagnetic vibrator is incorporated into a device. In FIG. 7, a flat-disc shaped electromagnetic vibrator 31 is covered with a elastic body 35. The electromagnetic vibrator 31 contains a reciprocating vibrator contained in a case 33 or a flat motor with an eccentric weight contained in the case 33. As was the case with examples already mentioned, an elastic pressing body 36 is disposed behind a power feeding terminals 34.

The same effects described in other embodiments can be expected with the fourth embodiment.

As has been described, the present invention can be applied to various types of electromagnetic vibrator.

The present invention has been described in terms of various preferred embodiments. However, the present invention is not limited to the foregoing embodiments. Various modifications and variations may be made within the scope of the present invention.

What is claimed is:

1. An electromagnetic vibrator adapted for incorporation in a device having a power feeding land, comprising:
   (a) a vibration generating mechanism;
   (b) a case for containing at least part of said vibration generating mechanism;
   (c) a spring-like power feeding terminal for supplying power to said vibration generating mechanism, said power feeding terminal protruding from said case;
   (d) an elastic body surrounding at least part of said case; and
   (e) an elastic pressing body deformable under pressure, separate from said elastic body, and disposed in a position opposite said power feeding terminal;
   wherein, with said electromagnetic vibrator incorporated into said device, said elastic pressing body presses said power feeding terminal toward contact with said power feeding land of said device to electrically connect said power feeding terminal to said power feeding land.

2. The electromagnetic vibrator as set forth in claim 1, wherein said power feeding terminal has elasticity, and the elasticity of said power feeding terminal is combined with the pressure of said elastic pressing body in contacting said power feeding terminal with said power feeding land.

3. The electromagnetic vibrator as set forth in claim 1, wherein part of said elastic pressing body pressing said power feeding terminal includes at least one protruding portion.

4. The electromagnetic vibrator as set forth in claim 1, wherein said elastic pressing body is of synthetic rubber.

5. The electromagnetic vibrator as set forth in claim 1, wherein said vibration generating mechanism includes a reciprocating vibrator.

6. The electromagnetic vibrator as set forth in claim 1, wherein said vibration generating mechanism is a motor with an eccentric weight.

7. The electromagnetic vibrator as set forth in claim 6, wherein the motor is shaped as a slim cylinder.

8. The electromagnetic vibrator as set forth in claim 1, wherein with said electromagnetic vibrator incorporated into the device, said power feeding terminal is pressed between said elastic pressing body and the power feeding land of the device.

9. A device comprising:
   (a) an electromagnetic vibrator; and
   (b) a power feeding land for supplying power to said electromagnetic vibrator, said power feeding land disposed in a position corresponding to a power feeding terminal of said electromagnetic vibrator;
   wherein said electromagnetic vibrator comprises:
   (i) a vibration generating mechanism;
   (ii) a case for containing at least part of the vibration generating mechanism;
   (iii) a spring-like power feeding terminal for supplying power to the vibration generating mechanism, said power feeding terminal protruding from the case;
   (iv) an elastic body surrounding at least part of the case; and
   (v) an elastic pressing body deformable under pressure, separate from the elastic body, and disposed in a position opposite said power feeding terminal;
   wherein, with said electromagnetic vibrator incorporated into said device, said elastic pressing body presses the power feeding terminal toward contact with said power feeding land of said device to electrically connect said power feeding terminal to said power feeding land.

10. The device as set forth in claim 9, wherein said power feeding terminal has elasticity, and the elasticity of said power feeding terminal is combined with the pressure of said elastic pressing body in the contacting of said power feeding terminal with said power feeding land.

11. The device as set forth in claim 9, wherein part of said elastic pressing body pressing the power feeding terminal includes at least one protruding portion.

12. The device as set forth in claim 9, wherein the elastic pressing body is of synthetic rubber.

13. The device as set forth in claim 9, wherein said vibration generating mechanism includes a reciprocating vibrator.

14. The device as set forth in claim 9, wherein said vibration generating mechanism is a motor with an eccentric weight.

15. The device as set forth in claim 14, wherein the motor is shaped as a slim cylinder.

* * * * *